United States Patent [19]

Eldredge et al.

[11] Patent Number: 5,399,260
[45] Date of Patent: Mar. 21, 1995

[54] FIELD PORTABLE WATER PURIFICATION SYSTEM

[76] Inventors: William A. Eldredge, P.O. Box 5457, Redwood City, Calif. 94063; Ronald C. Ball, 3639 Haven Ave., Menlo Park, Calif. 94025

[21] Appl. No.: 925,934

[22] Filed: Aug. 5, 1992

Related U.S. Application Data

[63] Continuation of Ser. No. 587,054, Sep. 21, 1990, abandoned, which is a continuation-in-part of Ser. No. 131,169, Dec. 10, 1987, abandoned.

[51] Int. Cl.⁶ .............................................. B01D 37/02
[52] U.S. Cl. ....................................... 210/87; 210/105; 210/193; 210/199; 210/205; 210/241; 210/411
[58] Field of Search .................... 210/87, 97, 143, 193, 210/199, 241, 249, 250, 416.3, 105, 205, 411

[56] References Cited

U.S. PATENT DOCUMENTS

| | | | |
|---|---|---|---|
| 4,332,680 | 6/1982 | O'Cheskey | 210/143 |
| 4,764,271 | 8/1988 | Acosta | 210/143 |
| 5,190,659 | 3/1993 | Wang et al. | 210/193 |

*Primary Examiner*—Ivars Cintins

[57] ABSTRACT

A mobile water filtration and chlorination system in modular form provides a universal water treatment, pump and distribution system.

33 Claims, 8 Drawing Sheets

FIELD PORTABLE WATER PURIFICATION SYSTEM

CROSS-REFERENCE TO RELATED APPLICATIONS

This patent application Ser. No. 07/925,034, filed Aug. 5, 1992, is a continuation application of patent application Ser. No. 07/587,054, filed Sep. 21, 1990, now abandoned, which in turn is a continuation-in-part application of patent application Ser. No. 07/131,169, filed Dec. 10, 1987, now abandoned.

BACKGROUND OF THE INVENTION

The invention relates to improvements in a basic system concept of self contained fresh water purification systems where all the required processing and control units are contained in one highly mobile, simple and efficient to operate unit. Especially the invention relates to the field of portable water purification systems, and in particular it relates to a diesel engine powered hydraulic controlled water purification system for temporary or emergency applications and use in remote areas. Special attention was paid to design and packaging to increase efficiency, mobility and a more cost effective, trouble free method of producing potable water.

Current units of a comparable physical size produce significantly less potable water and are more complex in both set-up and operation. Units capable of equal capacity are many times larger in physical size, usually require supporting equipment and therefore have a greater resource requirement.

SUMMARY OF THE INVENTION

The water purification system of the present invention consists of modules which can be used independent of each other and in various combination to match the requirements of different applications. Mobility is enhanced by mounting a standard set of modules in a common chassis which is not required for operation but which greatly improves transportability of the system.

A simple power unit included in the basic unit provides for reliable operation under severe circumstances. This power unit includes an air cooled diesel engine to take advantage of a greater fuel supply in the field and enhance safe operation of the system. The highly durable pump, directly linked to the engine provides both suction to draw in the untreated water and provides the water pressure for the operation of the system.

A new type of control of the various valves controlling different modes of operation and simplification of the preparation of water filter and chlorinator for operation ensures fast set-up and readiness in the field. More particularly, the invention provides for a simple to operate unit with automatic addition of chlorine to the water. Water filtration is accomplished by using a Diatomaceous Earth filter with a continuously maintained Diatomaceous Earth (D.E.) filter cake. Continuously maintaining the filter in operational condition extends operational time of the purification system before the system has to be shut down for cleaning and recoating the filter.

A basic unit of a mobile water purification system consists of a powered water pump module, a filter module and the control module.

DESCRIPTION OF THE PREFERRED EMBODIMENT

A basic unit of the mobile water purification system of the present invention consists of a powered water pump module, a filter module and a control module. These modules can be used as building blocks for larger treatment systems by interconnecting several of the modules in series or in parallel to increase throughput or to add various additives at desired rates to the water flow. Further consideration is given to system support in both components and serviceability.

In the system described in more detail in the specification the control module of the system contains the front panel controls for adjusting ratio feeder devices, one for adding chlorine to a desired level, and one for injecting a D.E. slurry mix to increase the efficiency of the filter. The control module also contains the Diatomaceous Earth (D.E.) slurry tank with an hydraulic turbine mixer to add filtration material to the filter septum, and the hypochlorinator tank supplying chlorine solution to kill water borne bacteria.

The filter module of the system contains the filter. The filter segments of the filter must be layered with D.E. to effect the desired filtration efficiency.

The purification system has three operational modes:

Precoating: Coating the filter leaves with a filter cake of D.E. prior to filtration operation.

Purification: Processing untreated water by adding chlorine to the water and filtering the water. This mode includes the addition of a slurry of D.E. and water, known as bodyfeed, to the unfiltered water to maintain an operative filter cake over long periods of operation.

Backwash: cleansing the filter leaves from used filter cake.

Precoating requires the preparation of a large amount of slurry, a mixture of water and D.E. in a short time period. This is accomplished by injecting water under pressure into a closed tank containing D.E. and producing a first grade of slurry, which is too thick for producing an even filter cake on the filter leaves. This first grade or primary slurry is mixed with water to produce a thinner secondary slurry which is fed to the filter and covers the filter leaves evenly with a filter cake.

During purification operation the untreated water is chlorinated by adding liquid chlorine proportional to the amount of pumped water. To maintain an operational filter cake over a long time period, a bodyfeed slurry is added to the untreated water prior to entering the filter. The D.E. of the bodyfeed slurry is deposited over the existing filter cake covering the filter leaves.

The addition of chlorine and also the addition of bodyfeed slurry to the water flow are controlled by feeder valves. These feeder valves are set manually to dispense desired amounts of chlorine and bodyfeed slurry per volume of untreated water passing through the purification system. A hydraulic control signal is generated by a water motor driven by the water flowing through the purification system. This hydraulic signal is fed to the feeder valves which controls the flow of proportionally dispensed additives.

The only source of energy for operating the purification system is water flow at a suitable pressure. This water flow is provided by a pump driven by a diesel engine. However, any other source of power with suitable RPMs and horse power can replace the diesel engine. Likewise, if a source of pressured water is available it can be connected directly to the control and filter module of this purification system.

Figure 1:
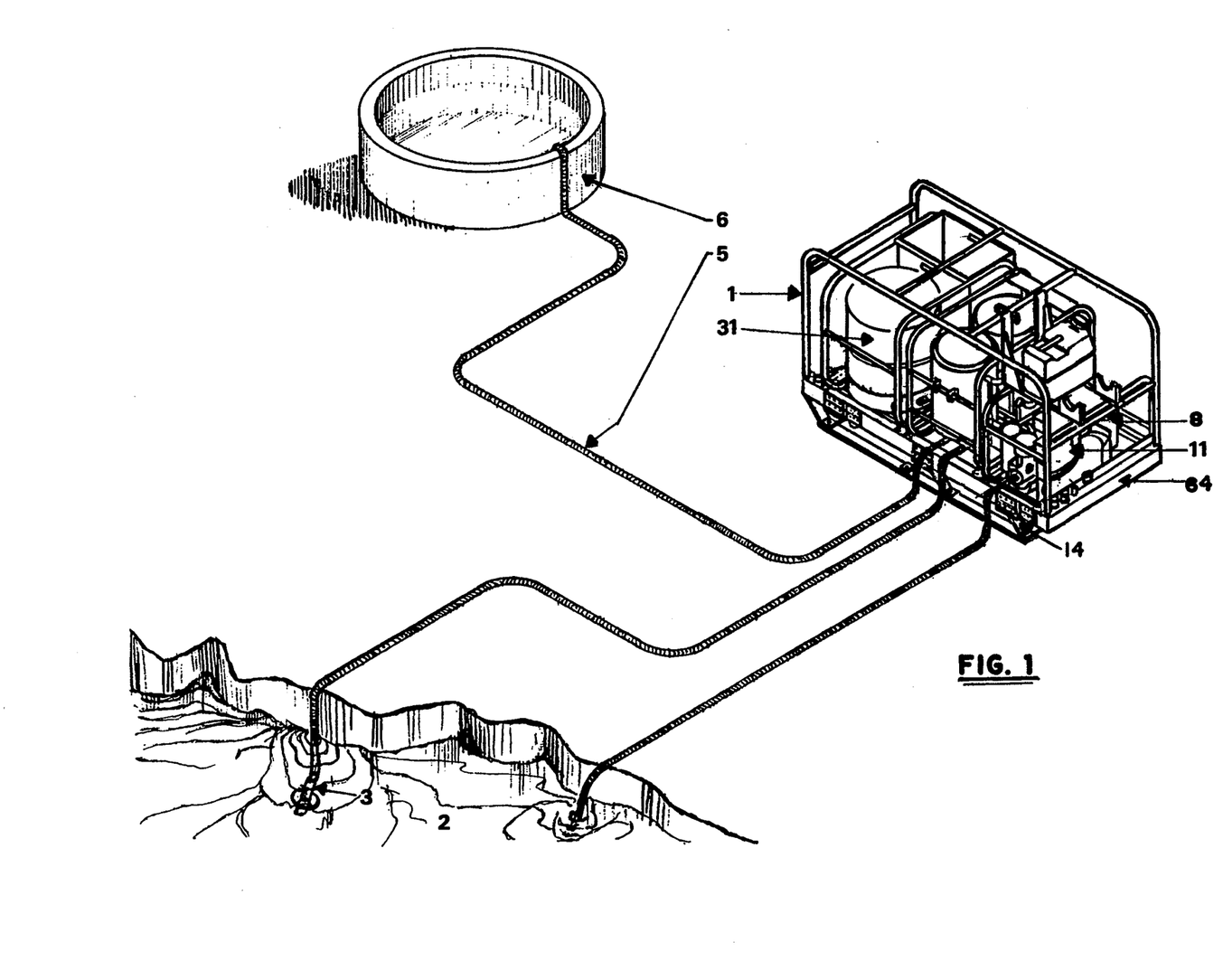
FIG. 1 is an illustration of the portable filtration unit in operation.

In FIG. 1 a portable water purification system 1 is shown in an application pumping water from an open source of water 2, such as a lake or creek through suction strainer 3 and intake hose 4. In FIG. 1 intake hose 4 is assembled from three hose sections 42a, 42b, and 42c. Intake hose 4 may be extended or shortened according to the particular circumstances. The purified water is discharged through hose 5 into a treated water storage tank 6. Hose 7 discharges untreated water and waste water from set-up and cleaning operation of the purification system. In FIG. 1 hose 7 discharges the water into the open water downstream of intake hose 4. Purification system 1 includes a diesel engine 8 which is the sole source of energy for operating the water purification system. Diesel engine 8 drives pump 11. All other devices such as the D.E. mixer and the injectors for additives are operated by hydraulic pressure of the pumped water.

Pump 11 pumps untreated water from source 2 and provides sufficient pressure to force the water through the modules of the purification system. Hypochlorinate tank 72 supplies chemicals for chlorinating the water. However, the unit may be used for adding other chemicals instead or in addition to chlorine to the flow of water passing through the purification system 1.

Purification system 1 consists of three modules removably mounted in main frame 64. The three modules are interconnected by hoses with cam lock type fittings. This provides for easy assembly of larger systems from purification modules and purification systems of different configurations. Attached to frame 64 are a pair of detacheable support skids, of which only skid 14 is visible in FIG. 1.

There are three hose connections provided. Intake port 41 receives untreated water. Waste water port 45 discharges untreated water and water used during set-up and cleaning operation of the purification system. Treated water leaves purification system through outlet port 44.

Figure 2A:
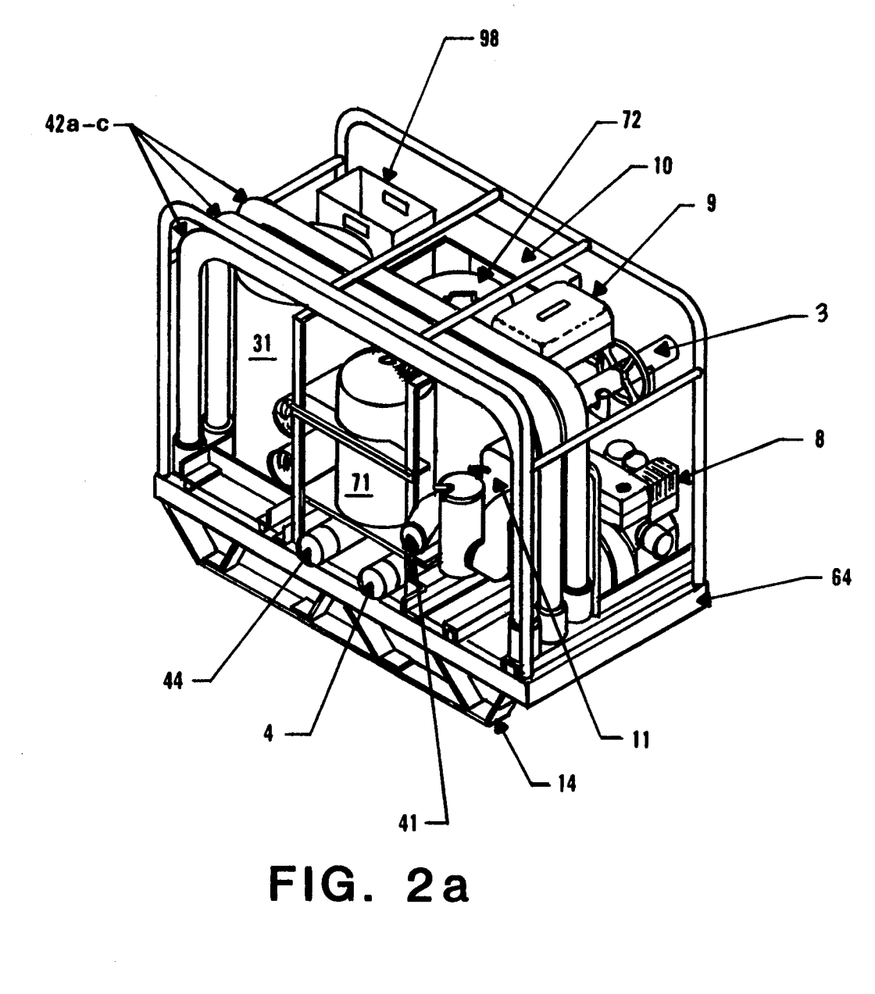
FIG. 2A is a perspective rear view illustration of the portable purification system.

FIG. 2A is a ¾ rear view of the invention showing the three modules mounted in the main frame with all provided provisions and water service connections. In FIG. 2a suction strainer 3 is shown in its storage for transport.

Figure 2B:
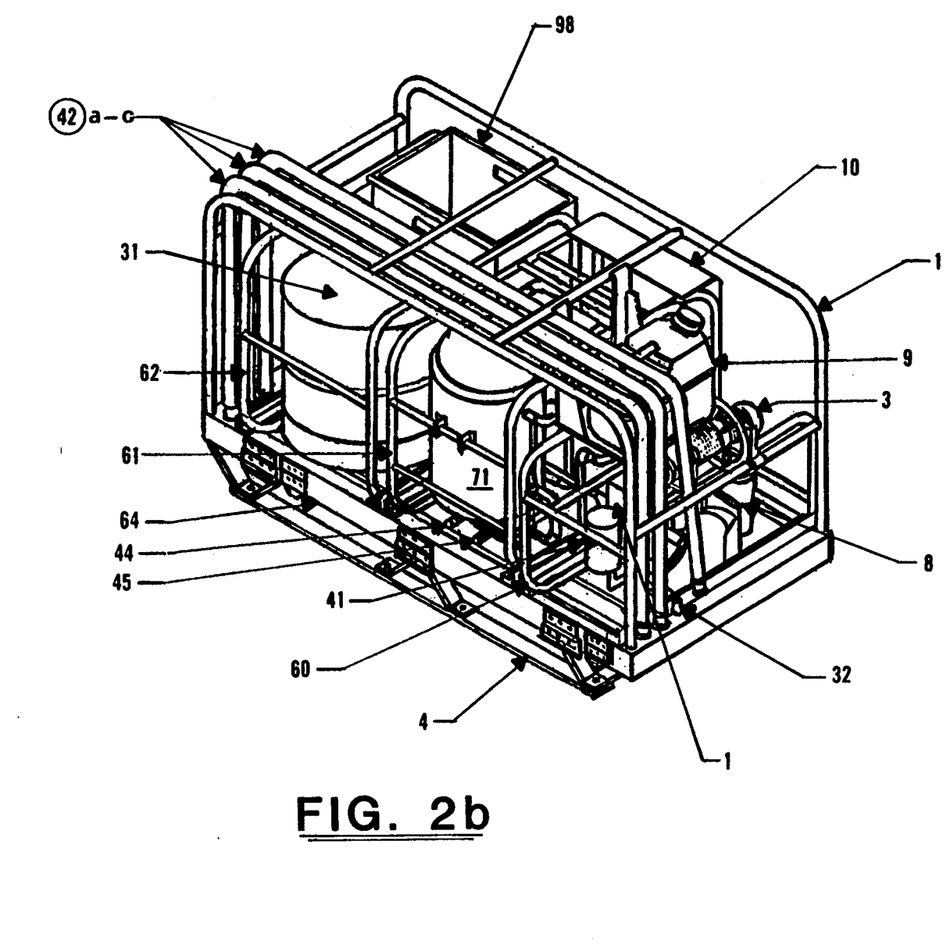
FIG. 2B is a more detailed perspective rear view illustration of the portable purification system.

FIG. 2B is a more detailed perspective view of purification system 1 and its three modules, power module 60, control module 61, and filter module 62. The three modules are removably mounted in frame 64.

Figure 4A:
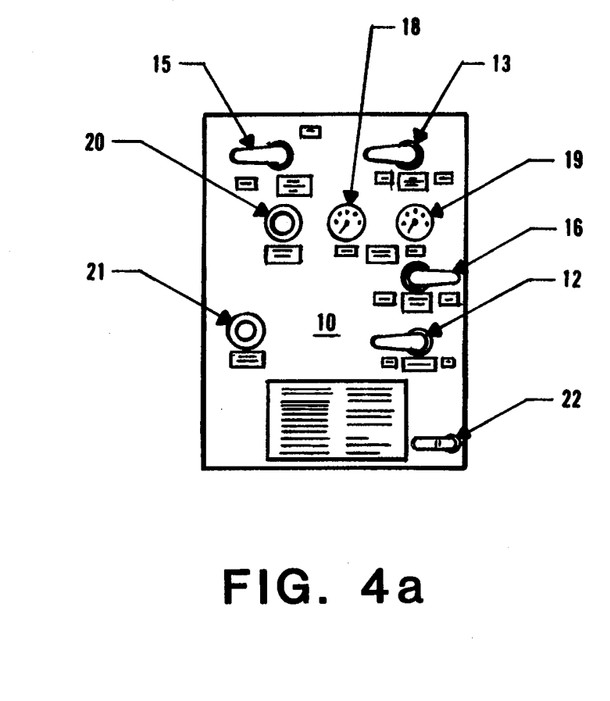
FIG. 4A is a front view illustration of a first embodiment of the front panel of the control module.
Figure 4B:
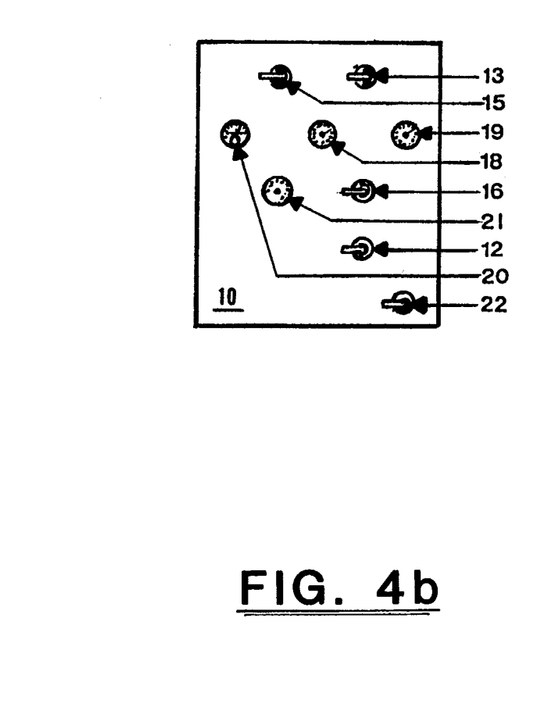
FIG. 4B is a detailed view of a second embodiment of the front panel of the control module.

Power module 60 includes diesel engine 8, and pump 11, which in FIGS. 2A and 2b is partially covered by hose sections 42a, 42b, and 42c. Water suction hose 4 of FIG. 1 connects to water intake port 41. D.E. Tank 71 is used to prepare a slurry and later a bodyfeed slurry from water and diatomaceous earth (D.E.) for coating the leaves of water filter 31 Hypochlorinate tank 72 flow control valves, and control panel 10 complete control module 61. Various water flow control valves are provided for selecting different modes of operations. The setting of these valves shown in FIGS. 4A and 4B are discussed below with reference to FIG. 8.

Filter module 62 includes filter 31 and a storage bin 98 for extra D.E. Filter 31 is of the type having porous filter leaves on which filtering material such as diatomaceous earth (D.E.) is deposited in the form of a filter cake.

When not in operation sections 42a, 42b, and 42c of intake hose 4 are mounted on dummy fittings in frame 1. Dummy fitting 32 is shown in FIG. 2. Tank 9 for spare fuel for engine 8 is attached to frame 64.

Figure 3:
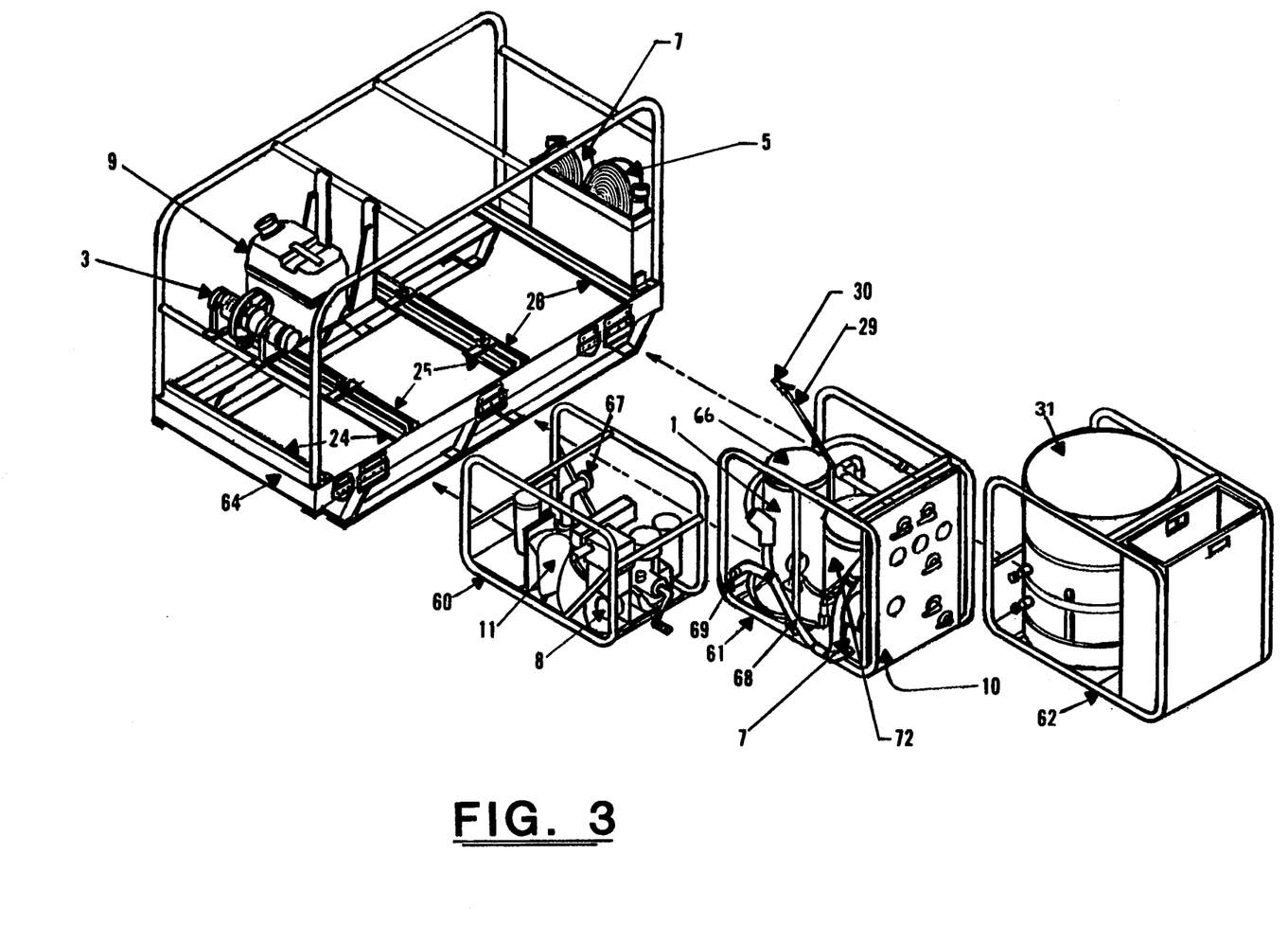
FIG. 3 is an exploded view of the portable purification system from the front side.

FIG. 3 is a front view illustration of modular water purification unit 1 with the three modules, power module 60, control module 61 and filter module 62, removed from main frame 64. Each of the modules is mounted on a pair of tracks of main frame 64. Power module 60 mounted on tracks 24, includes diesel engine 8 and pump 11. In operation pump outlet 67 of power module 60 is connected to water intake port 69 of control module 61 with cam lock type fittings. Control module 61 mounted on tracks 25 includes D.E. tank 71 for diatomaceous earth (D.E.) slurry mixing, hypochlorinate tank 72, various flow control valves which are discussed in connection with FIG. 4, and the control panel 10. Hoses 67 and 68 interconnect the outlet of pump 11 of module 60 with the intake of water motor 87 of module 61. The function of water motor 87 is described in detail in the description of FIGS. 8 and 9. Filter module 62 mounted on tracks 26, carries filter 31 and a storage bin 98 for D.E.

Hoses 5 and 7 can be stored during transportation as illustrated in FIG. 3.

FIG. 4a is a first embodiment of control panel 10, showing the pressure gauges controls for valves, chlorine and bodyfeed slurry feeder adjustments, and complete operating instructions. Once the D.E. tank 71 is filled with a prescribed amount of D.E., the pressure lid 66 is secured to D.E. tank 71, and hypochlorinate tank 72 is filled with liquid chlorine the system is ready for operation.

To start the processing cycle, precoat valve 12 is turned to "PRECOAT" and engine 8 is started. When precoat is verified in the filter sight glass located in the sidewall of filter 31, precoat valve 12 is turned from "PRECOAT" to "FILTER". Test samples are taken to determine proper chlorine level and to adjust chlorine feeder control 20 accordingly. All water pumped is discharged through waste water port 45. After a satisfactory water sample has been extracted from sample water valve 30 (FIG. 3) outlet control valve 13 is turned from "WASTE" to "CLEAN WATER".

Figure 6:
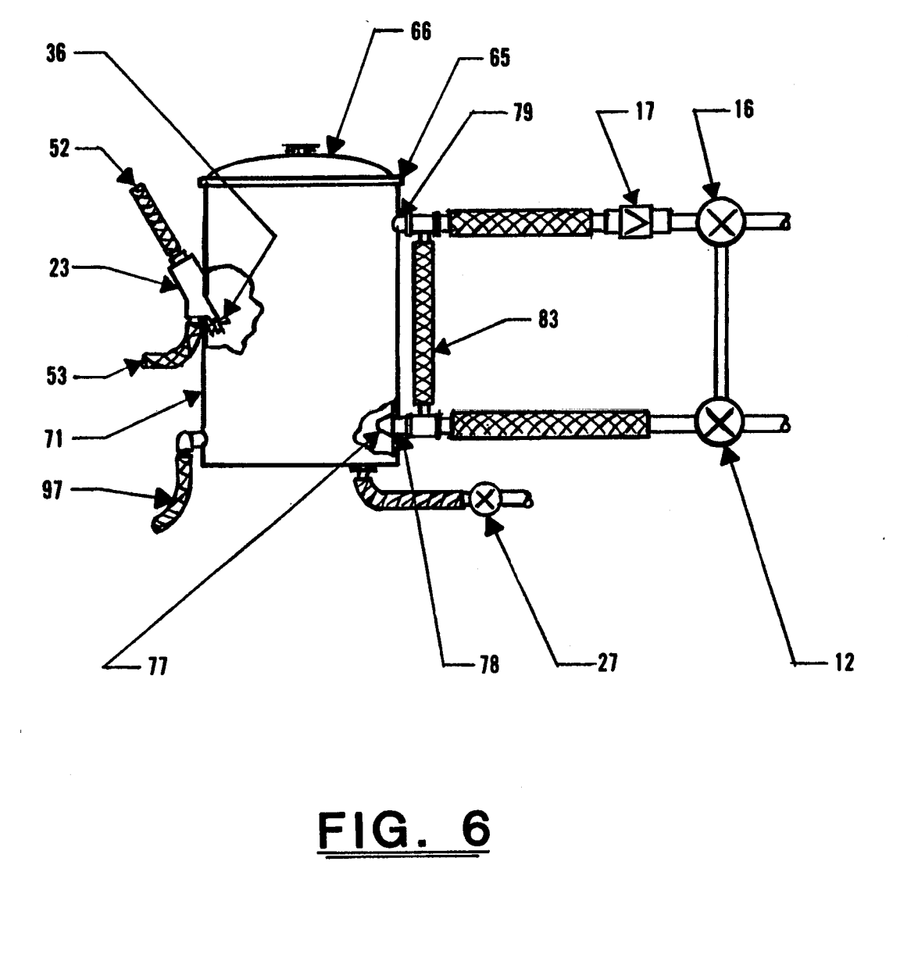
FIG. 6 is an illustration of the dual mode D.E. mixer.
Figure 7:
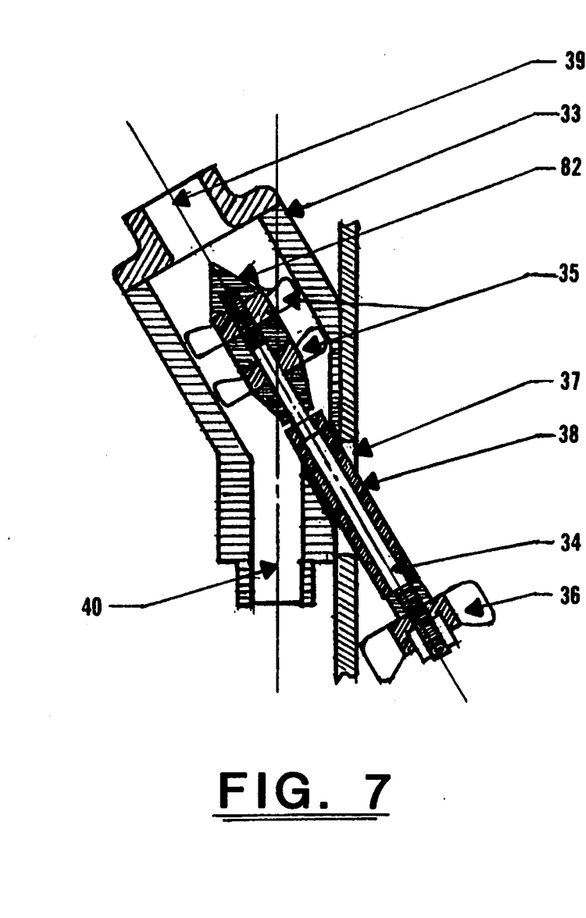
FIG. 7 is a schematic illustration of the hydraulic motor mixer.

At this time pressure lid 66 (FIG. 6) of D.E. tank 71 can be removed and D.E. can be added to the water in D.E. tank 71, using care not to impede the operation of hydraulic mixer 23 (see FIG. 7). Bodyfeed slurry feeder valve 96 (FIG.8) is to be set for proper level of bodyfeed slurry injection into the flow of untreated water using bodyfeed slurry feeder control 21.

To backwash filter 31 of the purification system, outlet control valve 13 is turned from "CLEAN WATER" to "WASTE", drain valve 22 of filter 31 is set to "OPEN", waste water outlet valve 15 is turned to "OFF" and backwash valve 16 is set to "BACKWASH". After the prescribed time valve 16 is returned from "BACKWASH" to "FILTER".

FIG. 4B is a illustration of another embodiment of control panel 10 of control module 61. Control panel 10 includes valve controls for setting up the desired operation, controls 20 and 21 for selecting and adjusting the desired ratios of chlorine and bodyfeed slurry to the flow of water, and gauges indicating water pressures. Setting valves 12, 13, 15, 16, 22 determines the flow of water through the system, the mode of operation: filter precoating, water purification, and backwash. These operation will be explained in detail with reference to FIG. 8. Chlorine and bodyfeed slurry are added during the purification operation to the pumped water at a selected ratio amount of additive to amount of pumped water. The setting of chlorine feeder control 20 determines the rate at which chlorine is to be added to the pumped water. The setting of bodyfeed slurry feeder control 21 determines the rate at which bodyfeed slurry is added to the flow of water for deposition on the filter cake in filter 31, thereby maintaining filter capability over an extended time period. Controls 20 and 21 set feeder valves 96 and 100, see FIGS. 8 and 9.

Figure 8:
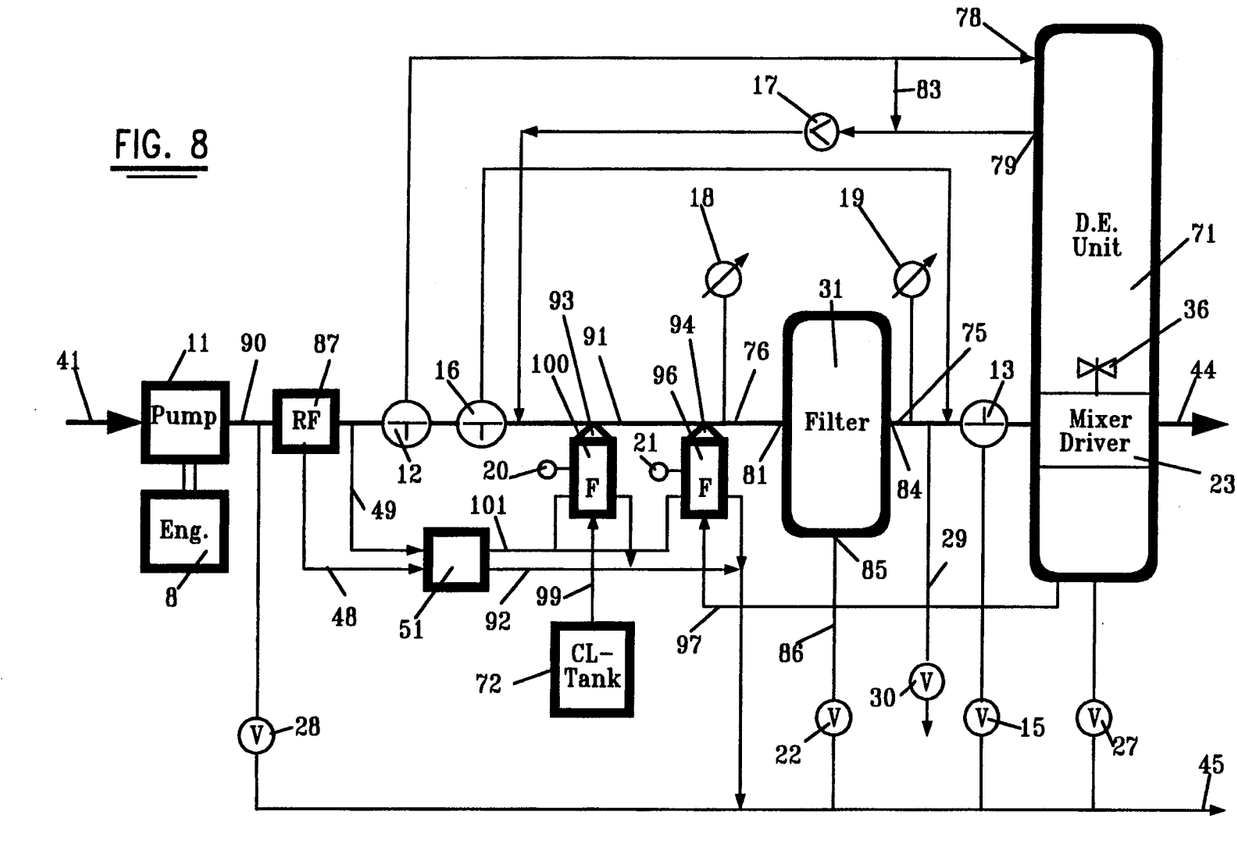
FIG. 8 is a schematic diagram of the water flow through the purification system.
Figure 9:
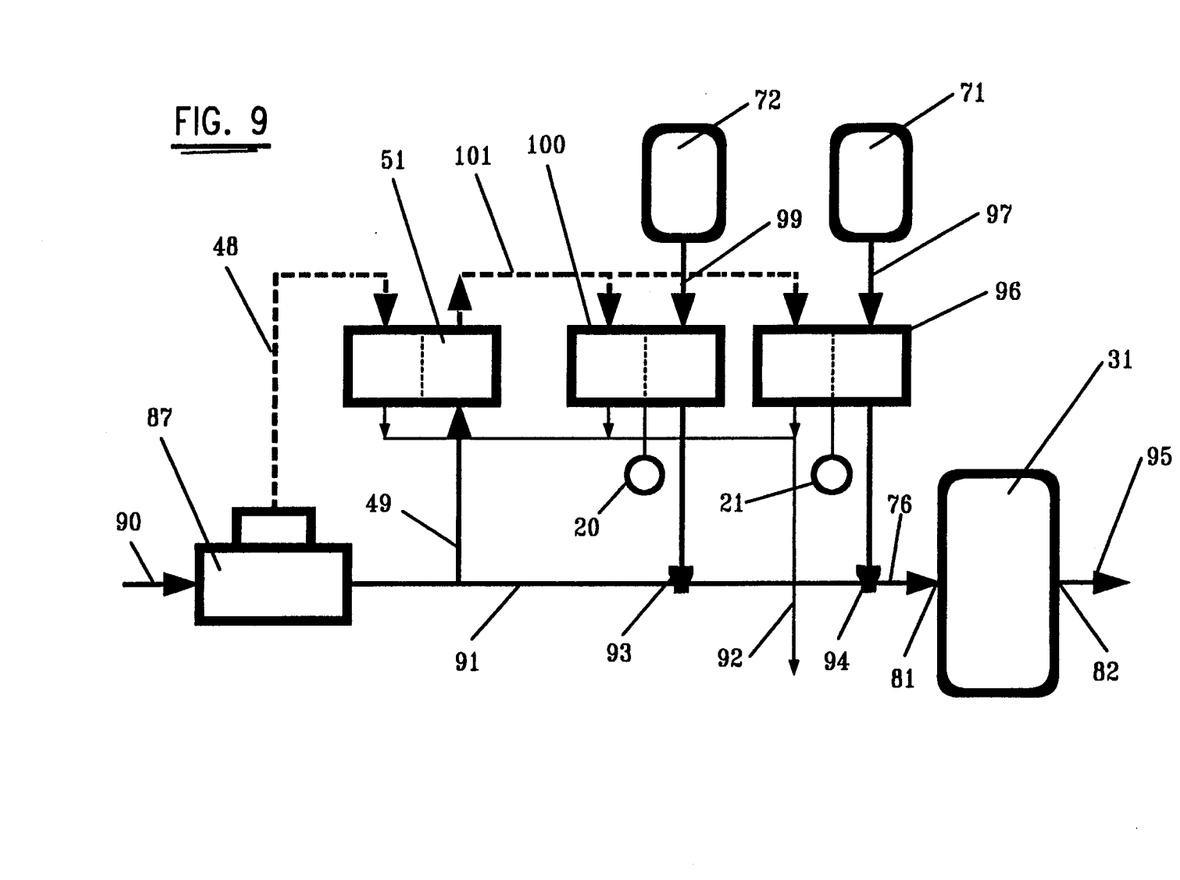
FIG. 9 is a schematic diagram of the hydraulic control for injecting additives into the flow of untreated water.

There are two pressure gauges 18 and 19 which indicate water pressure at inlet 81 of filter 31 and at outlet 84 of filter 31, respectively. Inlet 81 and outlet 84 are are shown in FIGS. 8 and 9. Water pressure values at the inlet and outlet of water filter 31 together indicate status of the filtration capability of filter 31. Besides the gauges, there is a window provided in the side wall of filter 31 for a partial visual inspection of the filter status. This window is not shown.

Figure 5:
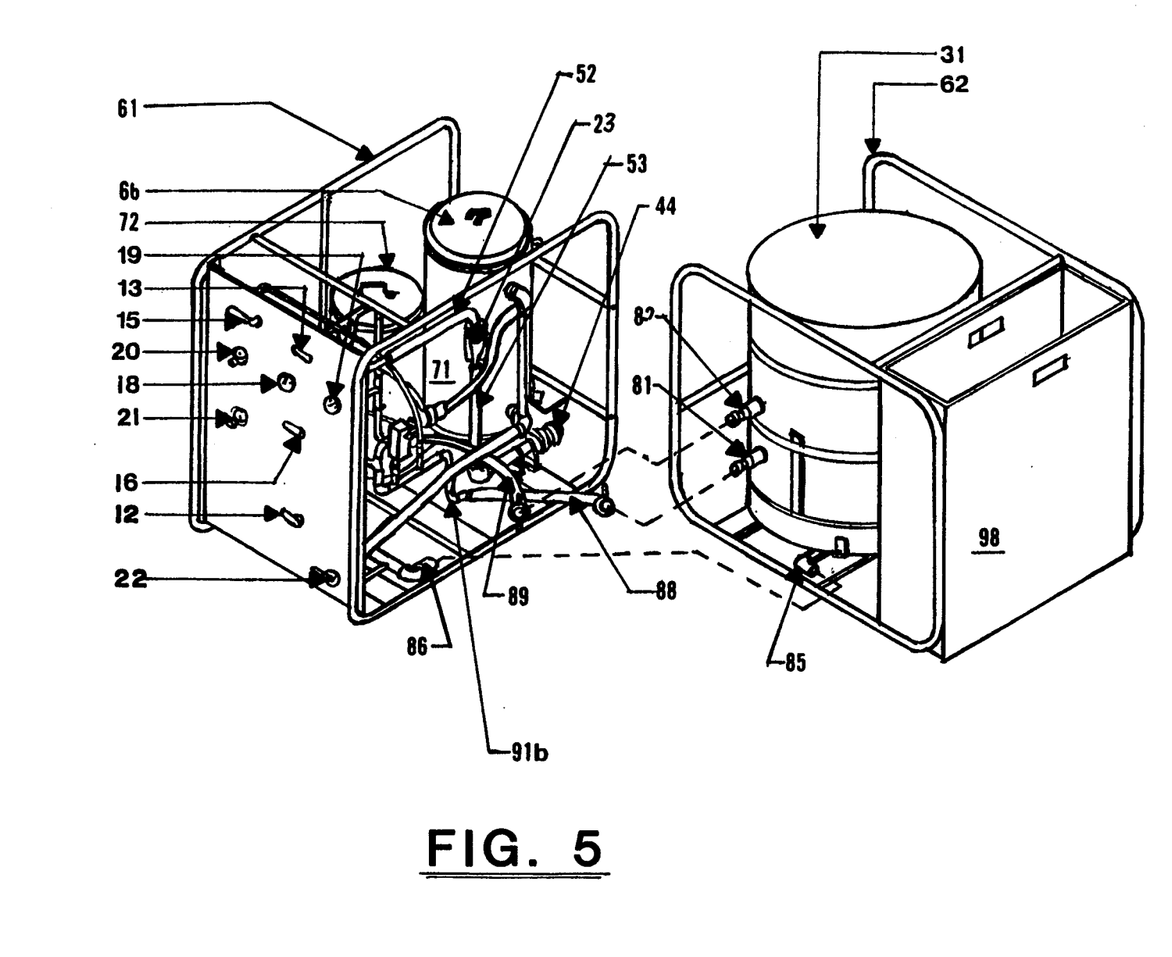
FIG. 5 is a perspective illustration of the control module, the filter module, and their interconnections.

FIG. 5 is a perspective illustration of control module 61, filter module 62, and their interconnections. Control module 61 includes control panel 10, D.E. tank 71 and chlorinator tank 72. There are three interconnections which link control module 61 with filter module 52. Filter inlet hose 88 connects pipe 91b of control module 61 with inlet port 81 of filter 31. Filter outlet hose 89 connects filter outlet port 84 with pressure gauge 19 and valve 13 of control panel 10. Filter drain outlet 85 connects to pipe 86 which allows draining filter 31 when backwash valve 22 is opened. The simple interconnections between filter module 62 and control module 61 underline the easiness with which modules can be exchanged.

FIG. 6 is an illustration of dual mode slurry tank 71 and its interconnections in the water purifications system of the present invention. Tank 71 is a cylindrical open tank. A cover 66 is used to close tank 71 during pressurized operation and can be secured to tank 71 with clamp band 65. At the bottom of tank 71 there is inlet water jet 77 through which pressurized water can be injected tangentially to cause a circular motion in tank 71 for mixing D.E. with the injected water At the top of tank 71 there is an outlet 79 through which the mix of water and D.E., the slurry, can leave tank 71.

Pressurized operation is used only during precoat operation when there is a high demand on D.E. slurry. For precoating operation, D.E. is loaded into tank 71. Tank 71 is closed with cover 66. Cover 66 is secured to tank 71 with clamp band 65. Setting valve 12 to "PRECOAT" and valve 16 to "FILTER" feeds pressurized water to tank inlet 78 and water jet 77 at the bottom of tank 71. The tangentially injected water produces within a short time an even primary slurry which leaves tank 71 through outlet 79. However, this primary slurry contains not enough water to generate an even filter cake in filter 72. Water from bypass 83 is mixed with primary slurry to produce a secondary slurry of the needed consistency for generating an even filter cake in filter 31. The secondary slurry flows through check valve 17 and valve 16, passes by injectors 93 and 94, and enters filter 72 through inlet 81 (FIG. 8).

During filter operation valve 12 is set to "FILTER". Check valve 17 prevents pressurized water from entering tank 71. Water and D.E. are manually added by the operator as needed. In this operation mixer 23 with propeller 36 rotating inside tank 71 is used to mix water and D.E. The mixture leaves tank 71 through line 97 to feeder valve 96, which is set by control 21. Mixer 23 is operated by the treated water before it leaves the purification system. The water just filtered in filter 31 and passing through valve 13 flows through a water turbine of mixer 23 and leaves the mixer and the purification system at outlet 44.

FIG. 7 is a cross-sectional illustration of slurry mixer 23 which is part of slurry tank 71 and which is driven by treated water after it passed through filter 31. During normal purification operation slurry mixer 23 produces in tank 71 a D.E. bodyfeed slurry which is injected into the flow of untreated water through injector 94 before the water enters filter 31. The water needed for this mixing operation is manually poured into tank 71 or it is taken from sample hose 29. The mixing operation takes place at normal atmospheric pressure. The amount of bodyfeed slurry added to the flow of water is metered by feeder valve 96 in a similar fashion as chlorine is metered in feeder valve 100 before it is added to the flow of untreated water.

Slurry mixer 23 consists of a water turbine which drives mixer blades 36. Mixer 23 is attached to tank 71. Mixer 23 includes housing 33, turbine shaft 34 and a turbine rotor with streamlined body 82 and a plurality of blades 35. Blades 35 are set at an angle to the flow of water to achieve the desired rotation of body 82 and the attached turbine shaft 34. Turbine shaft 34 is held in shaft bearing 38 and extends into tank 71 through opening 37 in the wall of tank 71. Shaft 34 carries mixer blades 36 for mixing D.E. and water. Treated water enters housing 33 at flange 39 through hose 52, drives the turbine rotor and leaves mixer 23 through outlet 40. A short hose 53 interconnects outlet 40 of mixer 23 with treated water port 44 of the purification system.

FIG. 8 is a schematic flow diagram of the purification system of the present invention. The purification system performs three types of operations:

precoat filter leaves of filter 31,
purify water, and
backwash filter 31.

In FIG. 8 flow direction control valves 12, 13 and 16 are set for filtration operation. In all three types of operations pump 11 driven by engine 8 pumps untreated water from a source, as illustrated in FIG. 1.

During a precoat operation water flow is directed by valve 12 to slurry tank inlet 78 of slurry tank 71. Inside tank 71 the water is tangentially injected by water jet 77 at the bottom of D.E. tank 71 and mixes in circular motion with the D.E. in tank 71. This circular motion generates within a short time a primary grade slurry of D.E. and water. This slurry contains to much D.E. to produce an even filter cake in filter 31. Therefore the primary D.E. slurry after leaving tank 71 through port 79, is mixed with water from water bypass 83 producing a first grade slurry and thinning it to a second grade slurry in a second step reduces the time required to perform a precoat operation. Because both the water from bypass 83 and the water injected into tank 71 are at the same pressure, the secondary grade mixture is of constant quality relative to the primary grade slurry. The secondary grade slurry is fed via check valve 17, passing by injectors 93 and 94, to filter port 81 of filter unit 31. The D.E is deposited as filter cake on filter leaves of filter 31. The water of the slurry mix passes through filter unit 31 and leaves filter 31 through port 84. Valves 13 and 15 direct this water to waste water outlet 45. During filtration operation water flows from fresh water intake port 41, pump 11 through valves 12 and 16, through feeder valves 100 and 96 to water inlet 81 of filter 31. While passing by injector 93 chlorine is injected into the water. Bodyfeed slurry mix of D.E. and water is added to the water at injector 94. The D.E. of the injected bodyfeed slurry is deposited constantly on the filter cake on the filter leaves of filter 31. The filtered and chlorinated water exits through filtered water outlet 84 of filter 31 and is fed to valve 13, from there, the treated water is directed to slurry mixer 23 of the D.E. Unit 7. Thereafter the treated water leaves the purification system through treated water outlet 44. Sample hose 29 and valve 30 are provided for collecting treated water samples.

In order to chlorinate water at a desired ratio to the water flow, the addition of chlorine to the pumped water depends on the amount of water flowing through the purification system. To maintain an operative filter cake in filter 31 over a long period of operation, a bodyfeed slurry is added to the flow of untreated water proportional to the flow of untreated water through the system. Water motor 87 is used to determine the flow of water and to generate an appropriate hydraulic control signal. This primary hydraulic signal is fed via pipe 48 to pilot valve 51. Pilot valve 51 controls the flow of pressured water from pipe 49 into pipe 101. Thus pilot valve 51 acts as an amplifier for the primary hydraulic signal supplied by water motor 87. This strong secondary hydraulic signal in pipe 101 controls feeder valves 100 and 96. Feeder valve 100 is set by feeder control 20 for a desired level of chlorination. Feeder valve 96 is set by feeder control 21 for a desired amount of bodyfeed slurry to the flow of untreated water.

This filter coating bodyfeed slurry add mix is prepared in tank 71 while the purification system is in normal filter mode. Continuously adding a small amount of D.E. to the water flow maintains good filter operation over long time periods and reduces maintenance down time of the purification system. Because bodyfeed slurry is added to the water flow under control of feeder valve 96 slurry tank 71 operates under atmospheric pressure and can be left open. During filtration operation the operator can add D.E. and water into tank 71 according to consumption without having to interrupt the filtration operation. Feeder valves 96 and 100 can be of the type offered by H. E. Andersen, Muskogee, Okla. under the name of 'Ratio:Feeder'. Primary hydraulic signal water from pipe 48 passes through pilot valve 51 to pipe 92 and waste water outlet 45. Secondary hydraulic signal water from pipe 101 passes through feeder valves 96 and 100 to pipe 92 and waste water outlet 45.

During backwash operation fresh water flows from pump 11 to valves 12 and 16. Valve 16 directs the water to the filtered water outlet 84 of filter 31. This water flows into the outlet opposite to the direction of water flow during a filtration or precoat operation. The waters under pressure, loosens the filter cake from the filter leaves. The water and used filter coating leave filter 31 through outlet 85 shown at the bottom of filter 31 controlled by valve 22. Backwash water flows directly to waste water outlet port 45

Valve 28 allows the system to pump water directly from the source to waste water port 45. Valve 27 is provided to discharge the contents of mixer tank 71 to discharge port 45.

FIG. 9 is a more detailed schematic illustration of the hydraulic control system used in the purification system of the present invention. Untreated water supplied by pump 11 through pipe 90 is fed through water motor 87 to pipes 91. Water motor 87 generates a pulsed water flow in pipe 48. The water required for this pulse water flow, the primary hydraulic signal, is taken from the water supplied via pipe 90. The frequency of the hydraulic pulses is proportional to the amount of water passing through water motor 87. However, the primary hydraulic signal is not capable of driving multiple hydraulic feeder valves. For this reason the primary hydraulic signal is fed to pilot valve 51.

Pilot valve 51 receives pressured water from pipe 91. Under control of the primary hydraulic signal pilot valve 51 opens at the frequency of the primary hydraulic signal and thus generates a secondary hydraulic signal in pipe 101. This secondary hydraulic signal is capable of operating a plurality of feeder valves, such as feeder valves 100 and 96. The water of primary hydraulic signal after passing through pilot valve 51 is released to pipe 92.

Secondary hydraulic signal in pipe 101 is fed to feeder valves 100 and 96, which operate in a similar fashion as pilot valve 51, except that feeder valves 100 and 96 have manually settable controls 20 and 21, respectively. Controls 20 and 21 set the amount of fluid to be fed per hydraulic signal pulse. Feeder valve 100 receives liquids to be dispensed from chlorine tank 72 and feeds chlorine to injector 93. Feeder 96 receives bodyfeed slurry from tank 71 and feeds the bodyfeed slurry to injector 94. Injectors 93 and 94 are attached to pipe 91. Pipe 76 feeds untreated water which passed through water motor 87 and injectors 93 and 94 to filter 31. ( In FIG. 9 both the operation selection valves 12 and 16 of FIGS. 4a and 4b are not shown to simplify the illustration.) Thus, additives such as chlorine and bodyfeed slurry are injected into the flow of untreated water at the pulse rate of the secondary hydraulic signal. The amount of the additives injected into the water flow per pulse is set by feeder controls 20 and 21 for injectors 93 and 94, respectively. The untreated water enriched by the additives is fed via pipe 76 to filter 31.

After operating feeder valves 100 and 96 the water of secondary hydraulic signal is released into pipe 92, which is connected to waste water outlet 45 (FIG. 1).

In the described preferred embodiment of the present invention the additive chlorine is used as an example for a liquid additive. It is understood, that other liquid additives could be dispensed from tank 72 instead. Furthermore, it is understood, that tank 71 could be used during precoat operation to prepare and supply D.E. slurry for coating the filter leaves of filter 31, and that it could be used during filter operation to dissolve non-liquid additives in a liquid which then is dispensed as a liquid additive into the flow of untreated water.

What I claim is:

1. A modular portable water flow-through purification apparatus comprising:

a frame and removeably mounted therein a power module including a water pump for providing pressurized water pumped from a water source, and a diesel engine for driving said water pump;

a filtration module including a water filter including filter leaves coated with a filter cake of diatomaceous earth;

a control module including a control panel, first interconnecting means for feeding said pressurized water received from said power module to said filtration module, and a treated water discharge port, and second interconnecting means for feeding filtered water from said filter module to said treated water discharge port;

said first interconnecting means including at least first controllable dispensing means for injecting first additives into said water flow, and second controllable dispensing means for injecting second additives to said water.

2. A modular portable water flow-through purification apparatus as claimed in claim 1, wherein said control module further comprising:

means for preparing a slurry of water and diatomaceous earth, including a tank with an opening for receiving said diatomaceous earth and a water inlet for injecting presurized water into said tank when preparing said slurry of said diatomaceous earth and said water;

third interconnecting means for supplying untreated water to said water inlet including a first controllable valve for directing said untreated water to said water inlet when preparing said slurry;

fourth interconnecting means for feeding said slurry from said tank to said water filter for precoating said filter leaves with said diatomaceous earth;

said fourth interconnecting means including an unidirectional valve.

3. A modular portable water flow-through purification apparatus as claimed in claim 2, further including a water bypass interconnecting said third interconnecting means and said fourth interconnecting means for having part of said untreated water bypass said tank.

4. A modular portable water flow-through purification apparatus as claimed in claim 1, wherein said control module further comprises means for preparing a slurry of water and diatomaceous earth, including tank with an opening for receiving said diatomaceous earth and water;

means for feeding said slurry of water and diatomaceous earth to said first controllable dispensing means for injecting said slurry into the flow of said untreated water in said first interconnecting means.

5. A modular portable water flow-through purification apparatus as claimed in claim 1, wherein said control module further includes a tank for preparing a slurry of diatomaceous earth and water having an opening for receiving said diatomaceous earth and water, a water inlet, an outlet, and a cover for closing said opening during pressurized operation;

third interconnecting means including a first controllable valve for directing said pressurized untreated water to said water inlet of said tank during precoat operation;

said tank having a water jet connected to said water inlet inside said tank for mixing a first grade of slurry by injecting said pressurize water into said tank containing diatomaceous earth;

said tank further including means for mixing a second grade of slurry from water and diatomaceous earth;

means for adding untreated water supplied by said third interconnecting means to said first grade slurry received from said tank thereby generating a precoat slurry;

fourth interconnecting means for feeding said precoat slurry to said water filter for precoating said filter leaves with said diatomaceous earth;

fifth interconnecting means for feeding said second grade of slurry from said tank to said first controllable dispensing means for injecting said second grade of slurry into the flow of said untreated water through said first interconnecting means;

said fourth interconnecting means including an unidirectional valve.

6. A modular portable water flow-through purification apparatus as claimed in claim 5, wherein said tank has a circular cross-section and said water jet injects said untreated pressurized water tangential to said tank walls causing a circular motion of the mixture of said diatomaceous earth and said water.

7. A modular portable water flow-through purification apparatus as claimed in claim 5, wherein said tank includes a water flow operated turbine mixer for preparing said second grade of slurry from said diatomaceous earth and said water.

8. A portable modular water flowthrough purification apparatus as claimed in claim 5, wherein said means for mixing a second grade of slurry is a part of said second interconnecting means.

9. A portable modular water flowthrough purification apparatus as claimed in claim 1, wherein said control module further comprises:

hypochlorinator tank;

means for feeding chlorine to said second controllable valve for injecting said chlorine into the flow of said untreated water in said first interconnecting means.

10. A modular portable water flow-through purification apparatus as claimed in claim 1, said control module further comprising means for continuously adding diatomaceous earth slurry to said filter leaves of said filter with said mixture of water and diatomaceous earth injected by said control module into said water flow, 11. A modular portable water flow-through purification apparatus as claimed in claim 1, wherein said filter includes a first port, a second port and a backwash port for releasing water and used diatomaceous earth from said filter during backwash operation;

means for backwashing said filter in said filter module including a third controllable valve for directing said pressurized water to said second port.

12. A modular portable water flow-through purification apparatus as claimed in claim 1, further comprising:

semi-rigid suction hose segments for connecting said pump of said power module with said water source;

a suction strainer, connected to the water source end of said suction hose;

said frame including dummy hose connectors for removably mounting said hose segments during transportation of the water purification apparatus.

13. A modular portable water flow-through purification apparatus as claimed in claim 1, wherein said modules are interconnected by flexible hoses and quick-connect linkages.

14. A modular portable water flow-through purification apparatus as claimed in claim 13, wherein said modules are interconnected by flexible hose segments and quick-connect linkages, and wherein said hose segments are connected with each other via quick connect linkages of the same type as used with said modules for interconnection.

15. A portable modular water flowthrough purification apparatus as claimed in claim 1, further including means for hydraulically controlling said first and second feeders.

16. A modular portable water flowthrough purification apparatus as claimed in claim 1, further comprising means for selecting service operations including at least a filter precoat operation and a filter backwash operation, and a waste discharge port for discharging water during said filter precoat operation and during said filter backwash operation.

17. A modular portable water flow-through purification apparatus as claimed in claim 1, wherein said frame is adapted for transport in small transport vehicles.

18. A modular portable water flow-through purification apparatus as claimed in claim 1, wherein said frame includes storage means for tools and storage means for fuel and supplies.

19. A modular portable water flow-through purification apparatus as claimed in claim 1, wherein said first dispensing means includes first control means for setting the injection rate for said first additives; and said second dispensing means includes second control means for setting the injection rate for said second additives.

20. A modular portable water flow-through purification apparatus as claimed in claim 1, said purification system further including signal generating means for generating a first control signal proportional to the flow of untreated water through said purification system;

said first dispensing means including first control means for setting a first injection rate for said first additives and third control means for changing said first rate proportional to said first control signal supplied to said third control means;

said second dispensing means including second control means for setting a second injection rate for said second additives and fourth control means for changing said second rate proportional to said first control signal supplied to said fourth control means.

21. A modular portable water flow-through purification apparatus as claimed in claim 20 further comprising means interconnecting said signal generating means with said first and second dispensing means for feeding said first control signal from said signal generating means to said third control means and said fourth control means;

said first control signal controlling said first and second dispensing means for dispensing additives and slurry respectively at rates proportionally to the rate of water flow through said signal generating means.

22. A modular portable water flow-through purification apparatus as claimed in claim 20, wherein said first control signal is a first pulsed hydraulic signal with a pulse rate proportional to the flow of water through said purification apparatus.

23. A modular portable water flow-through purification apparatus as claimed in claim 1, wherein said frame further includes removable skids (14) adapted for moving said apparatus close to a source of untreated water.

24. A modular portable water flow-through purification apparatus comprising:

a pump for supplying water from a water source;

a water filter including filter leaves for receiving filter material;

a dual mode mixer for mixing filter material and water, a sensor for determining the rate of water flow from said pump to said filter and generating a control signal proportional to said rate of water flow;

means for directing the flow of water through said purification system to perform selectively a filter coating operation, a water filtering operation or a filter backwash operation, whereby said dual mode mixer receives either pressurized water for producing a mixture of diatomaceous earth and water at a high rate for filter coating, or unpressurized water for producing a mixture of diatomaceous earth and water at a low rate;

means for adding said mixture of diatomaceous earth and water to said flow of water, first means for dispensing a liquid additive to said flow of water including a storage tank for said liquid additives and first means for injecting said liquid additives into said flow of water controlled by said sensor;

second means for dispensing slurry stored in said dual mode mixer to said flow of water including second means for injecting said slurry into said flow of water controlled by said sensor.

25. A portable modular water flow-through purification apparatus as claimed in claim 24, wherein said sensor generated control signal is a pulsed hydraulic signal with a pulse rate proportional to the flow of water through said sensor, and wherein said purification apparatus further includes:

means interconnecting said sensor with said first and second means for dispensing and feeding said hydraulic signal from said sensor to said first and second means for dispensing;

whereby said first means for dispensing provides additives to said first means for injecting at a first rate proportional to said pulse rate, and whereby said second means for dispensing provide said slurry to said second means for injecting at a second rate proportional to said pulse rate.

26. A portable modular water flow-through purification apparatus as claimed in claim 24, wherein said first and second means for dispensing include manual controls for setting the amount of liquid to be dispensed for a given rate of water flow through said sensor.

27. A modular portable water flow-through purification apparatus with at least a filter precoat mode and a filtration mode of operation comprising:

a filtration module including a water filter including filter leaves coated with a filter cake of diatomaceous earth;

a control module including a control panel, a pressurized water intake port, first interconnecting means for feeding said pressurized water received from an external source at said water intake port to said filtration module, a treated water discharge port, and second interconnecting means for feeding filtered water from said filter module to said treated water discharge port;

said first interconnecting means including at least first controllable dispensing means for injecting first additives into said water flow, and second controllable dispensing means for injecting second additives to said water.

28. A modular portable water flow-through purification apparatus as claimed in claim 27, wherein said control module further comprises:

means for preparing a slurry of water and diatomaceous earth, including a tank with an opening for receiving said diatomaceous earth and a water inlet for injecting pressurized water into said tank and preparing said slurry of said diatomaceous earth and said water;

third interconnecting means for supplying a flow of untreated water to said water inlet including a first controllable valve for directing said untreated water to said water inlet during filter precoat operation;

fourth interconnecting means for feeding said slurry from said tank to said water filter for precoating said filter leaves with said diatomaceous earth;

whereby said first controllable valve directs all untreated water from said intake port to said filtration module during filtration operation;

said fourth interconnecting means including an unidirectional valve.

29. A modular portable water flow-through purification apparatus as claimed in claim 28, further including a water bypass interconnecting said third interconnecting means and said fourth interconnecting means for having part of said untreated water bypass said tank.

30. A modular portable water flow-through purification apparatus as claimed in claim 27, wherein said control module further comprises:

means for preparing a slurry of water and diatomaceous earth, including a tank with an opening for receiving said diatomaceous earth and water;

means for feeding said slurry of water and diatomaceous earth to said first controllable dispensing means for injecting said slurry into the flow of said untreated water in said first interconnecting means.

31. A modular portable water flow-through purification apparatus as claimed in claim 29, wherein said control module further includes a tank for preparing a slurry of diatomaceous earth and water having an opening for receiving said diatomaceous earth and water, a water inlet, an outlet, and a cover for closing said opening during pressurized operation;

third interconnecting means including a first controllable valve for directing said pressurized untreated water to said water inlet;

said tank having a water jet connected to said water inlet inside said tank for mixing a first grade of slurry by injecting said pressurize water into said tank containing diatomaceous earth, and means for mixing water and diatomaceous earth for preparing a second grade of slurry from said water and said diatomaceous earth;

fourth interconnecting means for feeding said first grade of slurry from said tank to said water filter for precoating said filter leaves with said diatomaceous earth;

fifth interconnecting means for feeding said second grade of slurry from said tank to said first controllable dispensing means for injecting said slurry into the flow of said untreated water through first interconnecting means;

said fourth interconnecting means including an unidirectional valve;

whereby said first grade of slurry is prepared during said precoating operation, and said second grade of slurry is prepared during said purification operation.

32. A modular portable water flow-through purification apparatus comprising:

a pump for supplying water from a water source;

a water filter including filter leaves for receiving filter material;

a dual mode mixer for providing a slurry by mixing filter material and water a sensor for determining the rate of water flow from said pump to said filter and generating a control signal proportional to said rate of water flow;

first dispensing means controlled by said control signal for adding said slurry to said flow of water;

a backwash water outlet;

means for selecting a mode of operation, including means for directing at least a part of the flow of water through said purification system through said dual mode mixer during a pre-coating operation;

means for directing the flow of water past said first dispensing means to said water filter during a water purification operation, and means for directing the flow of water in reverse direction through said water filter to said backwash water outlet during a backwash operation.

33. A modular portable water flow-through purification apparatus as claimed in claim 32, wherein said dual mode mixer includes a mixer tank having a water inlet, a slurry outlet, and a water bypass pipe connected between said water inlet and said slurry outlet of said mixer tank, thereby providing a first water flow into said mixer tank for producing a primary slurry, and a second water flow through said tank bypass pipe, whereby said water from said bypass mixes with said primary slurry to provide a bodyfeed slurry.

* * * * *